United States Patent [19]

Tratz et al.

[11] Patent Number: 4,471,618
[45] Date of Patent: Sep. 18, 1984

[54] NUCLEAR POWER PLANT AND METHOD FOR THE OPERATION OF SUCH A POWER PLANT

[75] Inventors: Herbert Tratz, Ottensoos; Hans-Joachim Berger, Erlangen; Manfred Mischker, Hemhofen, all of Fed. Rep. of Germany

[73] Assignee: Kraftwerk Union Aktiengesellschaft, Mülheim, Fed. Rep. of Germany

[21] Appl. No.: 389,902

[22] Filed: Jun. 18, 1982

[30] Foreign Application Priority Data

Jul. 16, 1981 [DE] Fed. Rep. of Germany ....... 3128201
Apr. 8, 1982 [DE] Fed. Rep. of Germany ....... 3213287

[51] Int. Cl.$^3$ ............................................. F01K 13/00
[52] U.S. Cl. ......................................... 60/646; 60/657
[58] Field of Search ................................. 60/646, 657

[56] References Cited

U.S. PATENT DOCUMENTS 3,894,391 7/1975 Heitmann et al. ..................... 60/657
4,237,691 12/1980 Bodmer ............................. 60/657 X Primary Examiner—Allen M. Ostrager
Attorney, Agent, or Firm—Herbert L. Lerner; Laurence A. Greenbeg

[57] ABSTRACT

Nuclear power plant, including a steam generator having a secondary circuit including a steam-energy converter with a first return line for condensate of relatively lower temperature and a second return line for condensate of relatively higher temperature, a mechanically acting filter disposed in the first return line, an electro-magnetically acting filter disposed in the second return line, and a by-pass line having a cut off element disposed therein and originating from the second return line and discharging at a location in the first return line upstream of the mechanically acting filter, and a method for the operation of the power plant.

14 Claims, 1 Drawing Figure

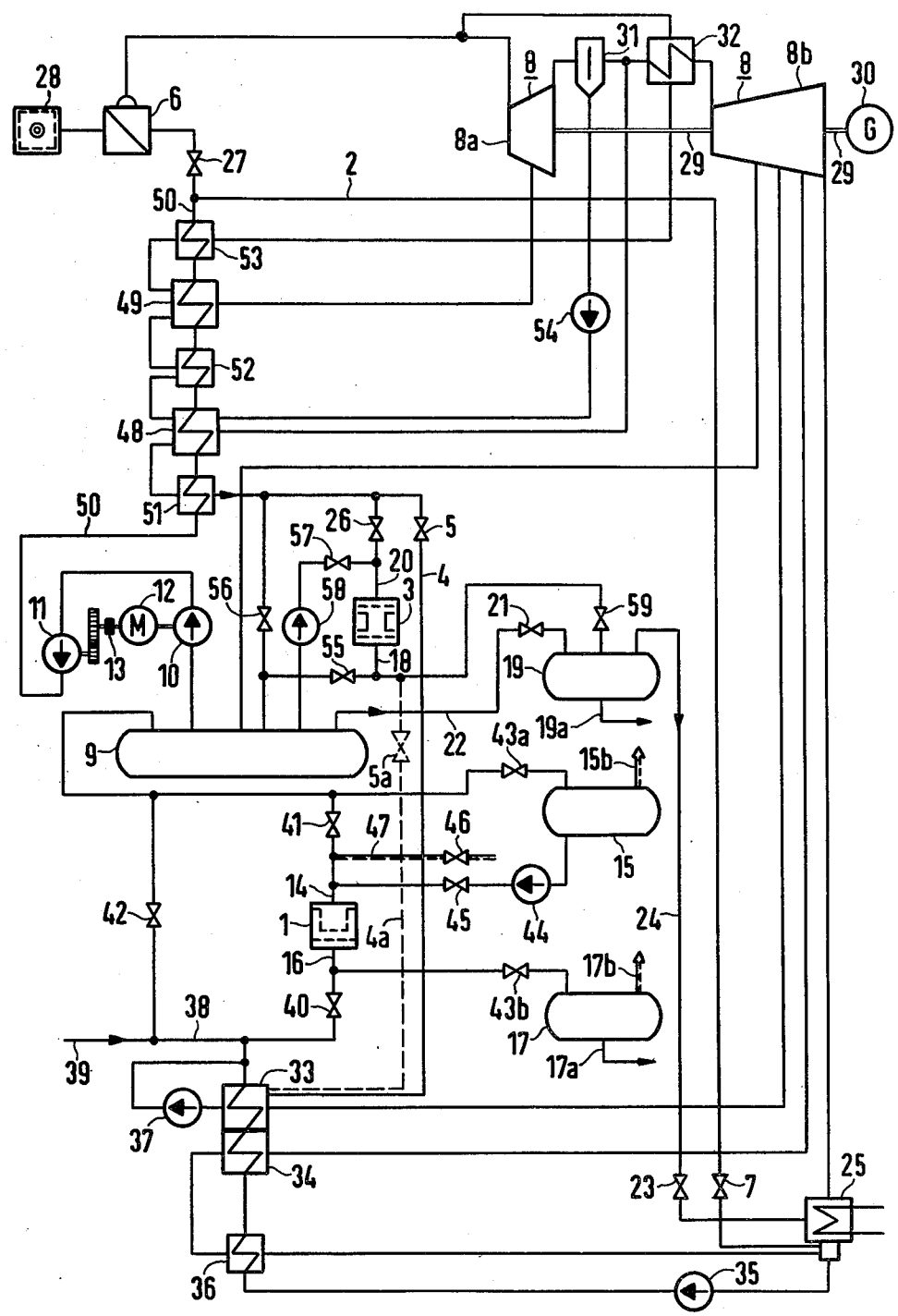

NUCLEAR POWER PLANT AND METHOD FOR THE OPERATION OF SUCH A POWER PLANT

The invention relates to a nuclear power plant with a steam generator, having a secondary circuit including a steam-energy converter with a first return line for condensate with a lower temperature, and a second return line for condensate with a higher temperature, and also to a method for operating such a power plant.

Such a nuclear power plant is known from FIG. 1 on page 24 in the publication "VG-Nuclear Power Plant-Seminar 1970" as having a steam-energy converter in the form of a steam turbine, which has a high pressure portion and low pressure portions. The first return line is attached through a steam condenser at the steam outlets of the low pressure portions. A condensate pump is provided in this return line and is connected by pipelines to a low pressure preheater for the condensate positioned downstream. This low pressure condensate preheater itself is connected to a feedwater tank for the steam generator through pipelines which also belong to the first return line.

The waste steam from the low pressure portion of the steam turbine is condensed in the steam condenser. The resulting condensate is pumped into the feedwater tank through the low pressure condensate-preheater, and the feedwater for the steam generator is taken from this feedwater tank.

A high pressure preheater for the feedwater of the steam generator and a waste separator with an intermediate superheater for the steam which is to be conducted to the low pressure portion of the steam turbine, are attached at the steam outlets of the high pressure portion of the steam turbine. The condensate produced in the high pressure preheaters, the water separators and intermediate superheaters is also conducted to the feedwater tank for the steam generator through the second return line, which essentially includes pipe lines, tanks and cooling apparatus.

In the secondary circuit of a nuclear power plant of this type, erosion and corrosion products are produced. The erosion products are small metal particles, which are carried away from the material of the turbine and other components forming the secondary circuit by the water contained in the secondary circuit.

In contrast thereto, the corrosion products are chemical compounds which are formed between the material of the turbine and other components and pipelines with chemical elements, which are contained in the steam and mainly in the condensate of the secondary circuit. These corrosion products are mostly rust.

The erosion and corrosion products produced in the secondary circuit can travel into the secondary part of the steam generator with the feedwater. There they are deposited on the surface of the secondary side heating tubes of the steam generator which are attached to the leading primary circuit of the nuclear reactor, as well as on the baseplate which supports these heating tubes. In particular, the erosion and corrosion products deposited on the outer surface of the secondary side of these heating tubes eventually form a coating there which considerably deteriorates the heat transfer to the feedwater in the secondary part of the steam generator.

It is known from German Published, Non-Prosecuted Application 29 49 975 to reduce the formation of such a coating on the surface of the heating tubes at the secondary side of a steam generator in a nuclear power plant by providing an auxiliary circuit with an electromagnetically acting filter in the secondary circuit. A part of the feedwater from the secondary circuit of the steam generator is pumped through the electromagnetic filter back into the secondary part of the steam generator through the hereinafore-described auxiliary circuit. In this electro-magnetically acting filter, the ferro-magnetic contaminations which can cause the above-mentioned coating on the heating tubes of the steam generator, are filtered from the feedwater which flows through the auxiliary circuit.

However, only a part of the feedwater containing the erosion and corrosion products is cleaned in the secondary part of the steam generator, i.e. the concentration of these erosion and corrosion products in the secondary part of the steam generator is reduced, but often the resulting reduction of the coating deposited at the outer surface of the heating tubes of the steam generator at their secondary side is insufficient.

It is accordingly an object of the invention to provide a nuclear power plant and a method for the operation of the same, which overcomes the hereinafore-mentioned disadvantages of the heretofore-known devices and methods of this general type, and to make certain that the coating which prevents the heat transfer at the secondary side surface of the heating tubes of the steam generator, is at least in a still further reduced amount.

With the foregoing and other objects in view there is provided, in accordance with the invention, a nuclear power plant, comprising a steam generator having a secondary circuit including a steam-energy converter with a first return line for condensate of relatively lower temperature and a second return line for condensate of relatively higher temperature, a mechanically acting filter disposed in the first return line, an electromagnetically acting filter disposed in the second return line, and a by-pass line having a cut off element disposed therein and originating from the second return line and discharging at a location in the first return line upstream of the mechanically acting filter.

In the starting phase in such a nuclear plant, when the condensate which is to be returned from the high pressure portion of the turbine through the second return line to the feedwater tank has relatively low temperature, and is therefore not sufficiently filtered by the electro-magnetically acting filter, the condensate can be conducted through the mechanically acting filter of the first return line device, so that from both return lines fully filtered condensate always flows into the feedwater tank, and from there into the secondary part of the steam generator. In this way the content of erosion and corrosion products of the feedwater in the secondary part of the steam generator is very considerably reduced, so that a coating of the heating tubes of the steam generator can only occur in a greatly reduced measure, if at all.

In accordance with another feature of the invention, there is provided another cut off element connected to the electro-magnetically acting filter, the by-pass line originating upstream of the electro-magnetically acting filter.

In a first mode of operating the nuclear power plant, there is provided a method which comprises closing the other cut off element of the electro-magnetically acting filter and opening the cut off element of the by-pass line at the start of operation and during operation with a partial load, and opening the other cut off element and closing the cut off element of the by-pass line during operation above a given load.

The magnetic and the relatively small mechanical filter action of the electro-magnetically acting filter can be additionally utilized, and a gradual heating of the electro-magnetically acting filter during the starting phase can be achieved, if in accordance with a further feature of the invention, the by-pass line originates downstream of the electro-magnetically acting filter.

In a second mode for operating the nuclear power plant, there is provided a method which comprises opening the cut off element of the by-pass line at the start of operation and during operation with a partial load, and closing the cut off element of the by-pass line during operation at least at a given load, or from a given load and up.

In accordance with an added feature of the invention, there is provided an additional cut off element disposed upstream of the steam generator, and a rinsing line containing a further cut off element and being connected in the secondary circuit of the steam generator originating upstream of the additional cut off element and discharging in the first return line.

In accordance with an additional feature of the invention, the electro-magnetically acting filter includes a filter container having electro-magnets in the form of magnetizable bodies (preferably spheres) disposed therein.

In accordance with again another feature of the invention, the mechanically acting filter is a cartridge filter.

In accordance with again a further feature of the invention, there is provided a feedwater tank disposed in the secondary circuit of the steam generator for receiving condensate from the first and second return lines, a feedwater pumping device in the form of a forepump and a main pump connected in series with each other between the feedwater tank and the steam generator, common means for driving the forepump and the main pump, and a clutch connected between the common driving means and the main pump.

In accordance with again an added feature of the invention, the mechanically acting filter has a pure condensate outlet and a raw condensate inlet, and there is provided a rinse water tank being selectively connected to the outlet and operating in conjunction with the mechanically acting filter, and a waste water tank being selectively connected to the inlet.

In accordance with again an additional feature of the invention, the electro-magnetically acting filter has a pure condensate outlet and a raw condensate inlet, and there is provided a waste water tank being selectively connected to the outlet, and a feedwater tank of the steam generator being disposed in the secondary circuit of the steam generator for receiving condensate at least from the second return line, the feedwater tank being connected to the inlet.

In accordance with yet another feature of the invention, the feedwater tank has a steam space formed therein, and there is provided a vapor deposition line having a cut off element and being in communication between the waste water tank and the steam space of the feedwater tank, a condenser of the first return line having a steam side, and an expansion line having a cut off element and being connected between the steam side of the condenser and the waste water tank.

In accordance with yet a further mode of the invention, there is provided a method which comprises closing the additional cut off element and opening the further cut off element for cleaning a part of the secondary circuit carrying condensate and feedwater before start up.

In accordance with a concomitant mode of the invention, there is provided a method which comprises disengaging the clutch for rinsing before start up.

An electro-magnetically acting filter has become known from FIG. 10 on page 745 in the journal "Maschinenmarkt-Industrie Journal 77 (1971)"; however, this filter is not used in a nuclear power plant, but in a conventional power plant with a Benson flow-through steam generator. In this case the filter is not used for high temperature condensate of the steam-energy converter, e.g. for condensate from the high pressure portion of a steam turbine, in the condensate return line, but the filter is rather used in the return line for low temperature condensate after a low-pressure preheater for the condensate. A return line of the steam-energy converter for condensate with a higher temperature is not shown as provided for the known conventional power plant, but such high temperature condensate is only produced in relatively small amounts in conventional power plants with a Benson flow-through steam generator, and is conducted into the feedwater tank without being filtered. In these small amounts of condensate with higher temperatures, corrosion products in the condensate in a Benson flow-through steam generator do not have the same effect as in a nuclear power plant.

A mechanical filter in the form of a cartridge filter is known from page 443 in the publication "Chemikerzeitung, 91. Jahrgang(1967) No. 2"; however, this cartridge filter is not disposed in a return line for condensate of a steam-energy converter of a nuclear power plant, but is used in the water supply line for make-up water of a steam generator which is not further described, to prevent the silting-up of the coils in this steam generator by contamination in the feedwater.

Other features which are considered as characteristic for the invention are set forth in the appended claims.

Although the invention is illustrated and described herein as embodied in a nuclear power plant and method for the operation of such a power plant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying single FIGURE of the drawing, which is a diagrammatic and schematic view of the secondary circuit of a nuclear power plant.

Referring now to the single FIGURE of the drawing, it is seen that the secondary nuclear power plant circuit shown therein has a pressurized water nuclear reactor 28 and a steam generator 6 disposed at the outlet side of the reactor. Forming the secondary circuit, a steam turbine 8 serving as a steam to energy converter, is connected to the live steam side of the secondary part of the steam generator 6. The steam turbine 8 includes a high pressure portion 8a and a low pressure portion 8b, having a common shaft 29 for driving an electrical generator 30.

Waste steam pipes of the high pressure turbine portion 8a are connected to a steam inlet pipe of the lower pressure portion 8b of the turbine through a water separator 31 and an intermediate super heater 32. The super heater 32 is connected at its superheated steam side to the live steam pipe of the high pressure portion 8a of the turbine.

A first return line circuit for the low temperature condensate in the secondary circuit of the steam generator 6 is provided with a condenser 25 and low pressure preheaters 33 and 34. The steam side of the condenser 25 is connected to the waste steam pipe of the low pressure portion 8b of the turbine, while the steam sides of the low pressure preheaters 33 and 34 are connected to the steam outlet pipes of the low pressure portion 8b of the turbine. Furthermore, part of the first return line circuit is a main condensate pump 35 connected to the condensate pipe of the condenser 25; a cooler 36 and the low pressure preheaters 33 and 34 being connected to the outlet of the pump. The side of the cooler 36 for the secondary condensate is connected to the secondary condensate side of the low pressure preheater 34 and to the condenser 25.

The secondary condensate side of the low pressure preheater 33 is connected through a secondary condensate pump 37 to a main condensate line 38, to which a main condensate outlet of the low pressure preheater 33 is also connected. Other additional condensate lines 39 may also be connected to the main condensate line 38. These other lines come from non-illustrated auxiliary systems, belonging to the first return line circuit for the low temperature condensate.

An inlet 16 for the raw condensate of a mechanically activated filter 1 is connected through a cut off armature 40 to the main condensate line 38. The mechanically activated filter 1 may be a cartridge filter, for example. A cartridge filter of this type is described, for instance, on pages 440 to 445 in the Journal "Chemiker-Zeitung/ Chem. Apparatur," 91, year (1967), No. 12. Essentially, this cartridge filter has a cylindrical filter element in the filter container which may, for example, be made of a suitably wound cotton or polypropylene cord.

An outlet 14 for the purified condensate of the mechanically activated or operating filter 1 is connected through a cut off armature 41 to a feedwater tank 9. A by-pass cut off valve 42 is disposed parallel to the mechanically acting or activated filter 1 with its preceding cut off valve 40 and the following cut off valve 41. Furthermore, a waste water tank 17 is connected through a cut off valve 43b to the raw condensate inlet 16 of the mechanically acting filter 1. The waste water tank 17 is provided with a line 17a for discharging waste water and a pipe 17b for ventilating.

Between the cut off valve 41 and the feedwater tank 9, there is additionally provided a rinsing or wash water tank 15 with a shut off valve 43a. The wash water tank is connected through a wash water pump 44 and another cut off valve 45 following the outlet of the pump to the outlet for the purified condensate of the mechanically acting filter 1. The wash water tank 15 is also provided with a connecting pipe 15b leading to the atmosphere. The outlet 14 of the mechanically acting filter 1 is additionally provided with a connection 47 to a compressed air source with a stop valve 46.

Furthermore, the secondary circuit of the steam generator 6 has a second return line for the condensate with higher temperature, which includes the condensate side of the intermediate super heater 32 and the water discharge side of the water separator 31. Other parts of the second return circuit for the higher temperature condensate are secondary condensate sides of high pressure feedwater preheaters 48 and 49, which are connected in series with each other and lie in a feedwater line 50 which leads to the secondary side of the steam generator 6. In this feedwater line 50, one of two coolers 51 and 52 is connected before each high pressure preheater 48 and 49. An additional cooler 53 is connected in the feedwater line 50 following the high pressure preheater 49. The inlet of the additional cooler 53 at the condensate side is connected to the outlet of the intermediate superheater 32 at its condensate side, and the outlet of the additional cooler 53 at the condensate side is connected to the high pressure preheater 49. The high pressure preheater 49 is connected at its steam side with a shut off valve 55. Furthermore, a by-pass slide valve 56 is arranged parallel to the electromagnetic filter 3 with its preceding cut off valve 26 and the downstream valve 55.

The inlet 20 for the raw condensate of the electromagnetic filter 3 is also connected to the feedwater tank 9 through a cut off valve 57 and a wash water pump 58. Furthermore, there is a by-pass line 4 with a shut off element 5, such as a slide valve, that is connected to the electromagnetic filter 3. The shut off element 5 is attached to the connection line between the secondary condensate outlet of the cooler 51 and the shut off valve 26. The by-pass line 4 leads to the low pressure preheater 33, and therefore to the first return line system.

Furthermore, an additional waste water tank 19 is connected through a cut off valve 59, to the outlet 18 for the pure condensate of the electromagnetic filter 3. The waste water tank 19 is connected to the feedwater tank 9 through a vapor deposition line 22, which has a shut off element 21, such as a cut off valve. The tank 19 is connected to the steam side of the condenser 25 which is connected before the first return line for the condensate. The connection is effected through an expansion line 24 including a shut off element 23, such as a cut off valve. The waste water tank 19 is additionally provided with a line 19a for discharging waste water.

In place of the by-pass line 4 which contains the cut off element 5, there can also be provided a by-pass line 4a, that is shown with dotted lines in the drawing and has a shut off element 5a, such as a slide valve. The by-pass originates from the raw condensate outlet 18 of the electro-magnetically acting filter 3, and leads to the low pressure preheater 33 and therefore to the first return line circuit.

A wash water line 2 is connected in the feedwater line 50, between the cooler 53 and a shut off element 27, such as a cut off slide valve disposed upstream of the steam generator 6. The wash water line 2 also has a shut off element 7 and it terminates in the condenser 25, and therefore into the first condensate return system. Furthermore, the feedwater line 50 is also attached to the feedwater tank 9. The line 50 is provided with a forepump or backing pump 10 for suction upstream of the cooler 51, and a main pump 11 connected in series with the cooler 51. The forepump 10 and a main pump 11 have a common driver 12, such as an electric motor, having a shaft being coupled to the drive shaft of the forepump 10 and to the drive shaft of the main pump 11, through a clutch 13.

During the following operation, before the nuclear power plant is set in operation, the shut off armatures or valves 27, 42, 43a, 43b, 45, 46 and 56 are closed and the shut off armatures or valves 7, 40 and 41 are open. Additionally, the main condensate pump 35 and the forepump 10 are set in operation with the clutch disengaged. In this way, fully desalinated water, which was previously filled into the feedwater tank 9 and into the condenser 25 is transported through the main condensate pump 35, the main condensate sides of the cooler 36, and the low pressure preheaters 33 and 34, through the main condensate line 38 and through the mechanically acting filter 1 into the feedwater tank 9. From the tank 9, the water is transported back to the condenser 25 by the forepump 10 through the main pump 11, through the feedwater line 50 containing the feedwater sides of the cooler 51, the high pressure preheater 48, the cooler 52, the high pressure preheater 49 and the cooler 53, and also through the rinsing or scavenger water line 2. Because of this operation, the contaminations in the flushed parts, such as erosion and corrosion products, are filtered out by the mechanically acting filter 1.

In the start up phase, the shut off element 27 is open and the clutch 13 is engaged. The shut off elements 7 and 21, the slide valves 42, 43a and 43b are closed, and the valves 45 and 46, 55, 56 and 26 and 57 are closed. The main condensate pump 35 is in operation, and the secondary condensate pump 37, the forepump 10, the main pump 11 and the water separator pump 54 are in operation. In this way the condensate produced in the condenser 25 and in the low pressure preheaters 34 and 33 is filtered in the mechanically acting filter 1, before it is transported into the feedwater tank 9. Additionally, the secondary condensate produced in the intermediate superheater 32, in the water separator 31 and in the high pressure preheaters 49 and 48, is by-passed through the by-pass line 4 shunting the electromagnetic filter 3 into the low pressure preheater 33. The secondary condensate is transported from the line 4 together with the secondary condensate produced there, through the mechanically acting filter 1 into the feedwater tank 9.

Instead of passing through the by-pass line 4, the secondary condensate which has been produced can also be conducted through the by-pass line 4a through the electro-magnetically acting filter 3 with the cut off valve 26 open, and with the cut off valve 5a into the low pressure preheater 33 also being open.

This procedure makes it certain that corrosion products which are not yet ferro-magnetic because the temperature is still too low, and which therefore cannot be filtered out by the electromagnetic filter 3, are nevertheless removed by the mechanically acting filter 1.

When rising up from a certain given load, at which the corrosion products have reached a temperature high enough to make them become ferro-magnetic, the cut off valve 5 or 5a, respectively, is closed, and the cut off valves 26 and 55 are open, so that the condensate coming from the cooler 51 is conducted through the electro-magnetically acting filter 3 into the feedwater tank 9.

For cleaning the contaminated mechanically operating filter 1, the scavenging or rinsing water tank 15 is filled with rinsing water by opening the cut off valves 40 and 41. The valve 42 is subsequently opened, and the cut off valves 40 and 41 are simultaneously closed. The cut off valve 43b is then opened. The cut off valve 46 is later opened, and the water is forced out of the mechanically acting filter 1 into the waste water tank 17 by compressed air. Next the cut off valves 46 and 43b are closed again, and the pump 44 is started. By opening the valve 45, the mechanically acting filter 1 is again filled with water. This cycle can be repeated several times to achieve a thorough cleaning of the mechanical filter 1.

To clean the electromagnetic filter 3, the cut off valves 55 and 26 are simultaneously closed and the by-pass slide valve 56 is opened. Additionally, when using the by-pass line 4a, shown in dotted lines, the cut off valve 5a in the by-pass line 4a must be closed. The field coil of the electromagnetic filter is then turned off, in order to demagnetize the magnetic filter elements. Next the rinsing water pump 58 is set in operation, and by opening the cut off valve 57, water from the feedwater tank 9 is pumped through the electro-magnetically acting filter 3 through the likewise open valve 59 into the waste water tank 19. After the rinsing period has ended, the valves 57 and 59 are closed again and the rinsing water pump 58 is turned off. The cut off valves 26 and 55 are then simultaneously opened again and the valve 56 is closed.

The rinsing water in the waste water tank 19 which has a relative high temperature, is cooled to a temperature corresponding to the pressure in the condenser 25 by opening the valve 23 through the expansion line 24. The rinsing water can then be discharged from the water tank 19 through the discharge line 19a.

It is advantageous to avoid temperature shocks affecting the waste water tank 19 before introducing the scavenge or rinse water by opening the valve 21, and to apply steam to the waste water tank 19 from the feedwater tank 9 through the vapor deposition line 22.

The foregoing is a description corresponding to German Application P 32 13 287.5, dated Apr. 8, 1982, the International priority of which is being claimed for the instant application, and which is hereby made part of this application. Any discrepancies between the foregoing specification and the aforementioned corresponding German application are to be resolved in favor of the latter.

We claim:

1. Nuclear power plant, comprising a steam generator having a secondary circuit including a steam-energy converter with a first return line for condensate of relatively lower temperature and a second return line for condensate of relatively higher temperature, a mechanically acting filter disposed in said first return line, an electro-magnetically acting filter disposed in said second return line, and a by-pass line having a cut off element disposed therein and originating from said second return line and discharging at a location in said first return line upstream of said mechanically acting filter.

2. Nuclear power plant according to claim 1, including another cut off element connected to said electro-magnetically acting filter, said by-pass line originating upstream of said electro-magnetically acting filter.

3. Nuclear power plant according to claim 1, wherein said by-pass line originates downstream of said electro-magnetically acting filter.

4. Nuclear power plant according to claim 1, including an additional cut off element disposed upstream of said steam generator, and a rinsing line containing a further cut off element and being connected in said secondary circuit of said steam generator originating upstream of said additional cut off element and discharging in said first return line.

5. Nuclear power plant according to claim 1, wherein said electro-magnetically acting filter includes a filter container having electro-magnets in the form of magnetizable bodies disposed therein.

6. Nuclear power plant according to claim 1, wherein said mechanically acting filter is a cartridge filter.

7. Nuclear power plant according to claim 1, including a feedwater tank disposed in said secondary circuit of said steam generator for receiving condensate from said first and second return lines, a feedwater pumping device in the form of a forepump and a main pump connected in series with each other between said feedwater tank and said steam generator, common means for driving said forepump and said main pump, and a clutch connected between said common driving means and said main pump.

8. Nuclear power plant according to claim 1, wherein said mechanically acting filter has a pure condensate outlet and a raw condensate inlet, and including a rinse water tank being selectively connected to said outlet and operating in conjunction with said mechanically acting filter, and a waste water tank being selectively connected to said inlet.

9. Nuclear power plant according to claim 1, wherein said electro-magnetically acting filter has a pure condensate outlet and a raw condensate inlet, and including a waste water tank being selectively connected to said outlet, and a feedwater tank of said steam generator being disposed in said secondary circuit of said steam generator for receiving condensate at least from said second return line, said feedwater tank being connected to said inlet.

10. Nuclear power plant according to claim 9, wherein said feedwater tank has a steam space formed therein, and including a vapor deposition line having a cut off element and being in communication between said waste water tank and said steam space of said feedwater tank, a condenser of said first return line having a steam side, and an expansion line having a cut off element and being connected between said steam side of said condenser and said waste water tank.

11. Method for operating a nuclear power plant, including a steam generator having a secondary circuit including a steam-energy converter with a first return line for condensate of relatively lower temperature and a second return line for condensate of relatively higher temperature, a mechanically acting filter disposed in the first return line, an electro-magnetically acting filter disposed in the second return line, a by-pass line having a cut off element disposed therein and originating from the second return line and discharging at a location in the first return line upstream of the mechanically acting filter, and another cut off element connected to the electro-magnetically acting filter, the by-pass line originating upstream of the electro-magnetically acting filter, which comprises closing the other cut off element of the electro-magnetically acting filter and opening the cut off element of the by-pass line at the start of operation and during operation with a partial load, and opening the other cut off element and closing the cut off element of the by-pass line during operation above a given load.

12. Method for operating a nuclear power plant, including a steam generator having a secondary circuit including a steam-energy converter with a first return line for condensate of relatively lower temperature and a second return line for condensate of relatively higher temperature, a mechanically acting filter disposed in the first return line, an electro-magnetically acting filter disposed in the second return line, a by-pass line having a cut off element disposed therein and originating from the second return line and discharging at a location in the first return line upstream of the mechanically acting filter, and the by-pass line originating downstream of the electro-magnetically acting filter, which comprises opening the cut off element of the by-pass line at the start of operation and during operation with a partial load, and closing the cut off element of the by-pass line during operation at least at a given load.

13. Method according to claim 11 or 12, including an additional cut off element disposed upstream of the steam generator, and a rinsing line containing a further cut off element and being connected in the secondary circuit of the steam generator originating upstream of the additional cut off element and discharging in the first return line, which comprises closing the additional cut off element and opening the further cut off element for cleaning a part of the secondary circuit carrying condensate and feedwater before start up.

14. Method according to claim 13, including a feedwater tank disposed in the secondary circuit of the steam generator for receiving condensate from the first and second return lines, a feedwater pumping device in the form of a forepump and a main pump connected in series with each other between the feedwater tank and the steam generator, common means for driving the forepump and the main pump, and a clutch connected between the common driving means and the main pump, which comprises disengaging the clutch for rinsing before start up.

* * * * *